United States Patent [19]
Herrick et al.

[11] Patent Number: 6,089,502
[45] Date of Patent: Jul. 18, 2000

[54] BLUNT-LEADING-EDGE RAKED WINGTIPS

[75] Inventors: Larry L. Herrick, Redmond; C. Byram Bays-Muchmore, Bellevue; Michael S. Hoffman, Kirkland; Louis L. LeGrand, Seattle, all of Wash.; Steven S. Ogg, Carlsbad, Calif.; Bernard P. Paul, Jr., Bellevue, Wash.; Kenneth D. Visser, Seattle, Wash.; Stephen L. Wells, Bothell, Wash.

[73] Assignee: The Boeing Company, Seattle, Wash.

[21] Appl. No.: 09/096,464

[22] Filed: Jun. 12, 1998

Related U.S. Application Data

[60] Provisional application No. 60/049,600, Jun. 13, 1997.

[51] Int. Cl.[7] ........................................................ B64C 3/10
[52] U.S. Cl. ........................................ 244/35 R; 244/45 R
[58] Field of Search ................................. 244/35 R, 198, 244/199, 45 R

[56] References Cited

U.S. PATENT DOCUMENTS

| | | | |
|---|---|---|---|
| 2,575,185 | 11/1951 | Mulholland | 244/35 R |
| 2,709,052 | 5/1955 | Berg | 244/35 R |
| 4,248,572 | 2/1981 | Fradenburgh . | |
| 4,700,911 | 10/1987 | Zimmer | 244/35 R |
| 4,776,542 | 10/1988 | Van Dam . | |
| 5,039,032 | 8/1991 | Rudolph . | |
| 5,348,253 | 9/1994 | Gratzer . | |

FOREIGN PATENT DOCUMENTS

| | | |
|---|---|---|
| 0 067 097 | 12/1982 | European Pat. Off. . |
| 2 043 572 | 10/1980 | United Kingdom . |

OTHER PUBLICATIONS

"Wind Tunnel Tests Favor Raked Tip Wings," by Debbie Nomaguchi, Boeing News, published Jun. 27, 1997.

*Primary Examiner*—Galen L. Barefoot
*Attorney, Agent, or Firm*—Christensen O'Connor Johnson Kindness PLLC

[57] ABSTRACT

An airplane having a fuselage (11), opposed main wings (12), and blunt-leading-edge raked wingtips (8) is provided. Each main wing includes an outboard end (9) and a leading edge (14) having an outboard end leading-edge nose and nose radius. One blunt raked wingtip (8) is located at each main wing outboard end (9) and includes a leading edge (20) swept back from the main wing leading edge (14). Each blunt raked wingtip (8) further includes a plurality of local airfoils each having a leading-edge nose radius and a chord. The nose radius is greater than about 2% of the local chord for the majority of the airfoils. The relative bluntness of the raked wingtips minimizes boundary-layer separation, drag associated with boundary-layer separation, and premature buffeting of the aircraft during low speed flight.

34 Claims, 9 Drawing Sheets

BLUNT-LEADING-EDGE RAKED WINGTIPS

RELATED APPLICATIONS

This application is based on and claims the benefit of U.S. Provisional Application Ser. No. 60/049,600 filed Jun. 13, 1997.

FIELD OF THE INVENTION

This invention relates to aeronautic sustaining airfoils, and more particularly to raked wingtips.

BACKGROUND OF THE INVENTION

The performance of a commercial transport airplane is typically measured in terms of mission capability and operating costs. Mission capability can be improved by reducing airplane drag during takeoff climb and cruise, and by utilizing designs that minimize structural weight. Operating costs can be reduced by reducing airplane cruise drag (hence, resulting in less fuel burn and less fuel costs) and by utilizing designs that are inexpensive to manufacture and maintain. Further, for commercial operators, higher profits can be achieved by being able to transport more customers and/or goods for a given flight. Because the additional payload increases takeoff weight, it is even more desirable to reduce takeoff drag for takeoff-climb-limited missions.

The objectives of reducing drag, reducing weight, and reducing complexity (hence manufacturing and maintenance costs) are often in conflict. Adding a wingtip extension member can reduce the drag of a given airplane, but this will usually require increasing structural weight. Weight increases are due to the weight of the wingtip extension member and also due to strengthening required of the existing wing structure in order to support the increased bending moments exerted by the wingtip extension member. Additional weight penalties can also occur if the extension exacerbates flutter.

This conflict between the benefits of reduced drag and the disadvantages of increased weight has motivated designers to find an optimal balance between the two when designing a wingtip extension member. One such attempt is described in U.S. Pat. No. 5,039,032, hereinafter the '032 patent, incorporated herein by reference. The '032 patent describes a number of wingspan extensions termed "High Taper Wing Tip Extensions". These are also known as "raked wingtips". Raked wingtips are generally characterized by leading-edge sweep angles that are greater than the main wing sweep angles and are significantly tapered (i.e., the chord length decreases in the spanwise direction.)

Raked wingtips offer several advantages, some of which are outlined in the '032 patent. These advantages include the aerodynamic benefit of drag reduction due to increased wingspan, and a number of weight-reduction advantages (relative to simply extending the wingspan of an existing conventional main wing.) Two weight advantages are attributed to the wingtip taper. At high-load-factor structural design conditions, the smaller chords are subjected to less load and they result in less induced loading on the outboard main wing. These are both factors that reduce the bending moment that the inboard wing must support. Two more weight advantages are attributed to leading-edge sweep. The leading-edge sweep of a raked wingtip results in the center of pressure being located further aft than for a simple extension of an existing conventional main wing. At the high load-factor structural design conditions, this relative aft-movement of the center of pressure causes the sections of the main wing adjacent to the raked wingtip to be twisted more leading-edge-down, thus reducing the loading on these sections and the bending moment that the inboard wing must support. The relative aft-movement of the center of pressure also acts to attenuate flutter. The raked wingtips described in patent '032 range from moderate span extensions (e.g., 6% increase in span) to large span extensions (e.g., 12% increase in span). It is the large span extensions that offer the greatest benefits.

Regardless of these benefits, there are challenges in implementing raked wingtips on some aircraft. For example, on aircraft designed to operate at high subsonic Mach numbers (i.e., at or greater than about 0.70) there is a tendency for the boundary layer on the upper surface of each raked wingtip to separate under high-lift conditions (such as during takeoff climb or landing). This boundary-layer separation has the potential to increase drag and to generate premature buffet. The primary motivation for adding a wingspan extension is to increase the lift-to-drag ratio (primarily by decreasing drag), both during cruise and takeoff climb. If there is a significant drag increase due to large-scale boundary-layer separation under takeoff climb conditions, part or all of the takeoff-climb improvement is lost. When the raked wingtip boundary layer separates, there is also a possibility of unsteady aerodynamic forces strong enough to vibrate the airplane structure and to be perceived by the airplane pilot as buffet indicating the onset of aerodynamic wing stall. If this form of buffet occurs prematurely (that is, within what would normally be the operating envelope), stall speed must be declared at a speed significantly higher than the aerodynamic wing stall, thus degrading airplane performance.

The '032 patent acknowledges the tendency of the boundary layers on raked wingtips to separate under high-lift conditions. In the '032 patent, raked wingtips are categorized into two groups, one group with leading-edge sweep angles between 40 and 50 degrees and another with leading-edge sweep angles between 50 and 60 degrees. For the first group, the '032 patent indicates that some form of a mechanical leading-edge high-lift device (such as a slat) is required in order to avoid premature low-speed buffet. The addition of a mechanical leading-edge high-lift device avoids premature boundary-layer separation, alleviating the buffet problem, but it adds profile drag, weight, complexity, and cost. Under some circumstances, these disadvantages may outweigh the benefits of the raked wingtip. For the second group, the '032 patent indicates that the wingtip leading-edge sweep is great enough to trigger the formation of a stable leading-edge vortex, and that therefore premature buffet will not occur and no high-lift mechanisms are required.

The inventors herein have discovered that under some circumstances, leading-edge sweep angles of 50 to 60 degrees may not be adequate to ensure the formation of a stable leading-edge vortex when conventional transonic airfoils are used for the raked wingtip geometry. As used herein, "transonic airfoils" are those designed to operate at high subsonic freestream Mach numbers, with significant regions of locally supersonic flow. Additionally, even if the presence of a stable leading-edge vortex prevents premature buffet, such a vortex may result in higher drag than if the majority of the raked wingtip boundary layer could be kept attached over the range of typical operating conditions. Further, the technical viability of any raked wingtip would be improved greatly if there was no requirement for a leading-edge high-lift mechanism.

Thus, a need exists for an improved raked wingtip, particularly for use with aircraft that operate at high subsonic Mach numbers. The ideal raked wingtip would provide the aerodynamic benefits of an increase in wing span, while avoiding premature boundary-layer separation under high-lift conditions. Further, the optimal arrangement would not add significantly to wing weight or wing complexity. The present invention is directed to fulfilling this need.

SUMMARY OF THE INVENTION

In accordance with aspects of the present invention, a high subsonic Mach number airplane is provided having a fuselage, opposed main wings each including an inboard end attached to the fuselage and an outboard end, and a pair of raked wingtips. Each wingtip has an outboard end, a root end connected to a main wing outboard end and a plurality of local airfoils. The span of each raked wingtip is at least 4% of the semispan. Each local airfoil includes a leading-edge nose radius, a chord, and a maximum thickness. The ratio of wingtip local nose radius-to-chord is greater than the ratio of wingtip root nose radius-to-chord over the majority of the wingtip span.

In accordance with further aspects of this invention, a transonic airplane is provided characterized by the combination of opposed main wings each including an outboard end, and a pair of raked wingtips. Each wingtip has a root end connected to a main wing outboard end. Each raked wingtip further including a plurality of local airfoils each having a leading-edge nose radius, a chord, and a maximum thickness. The ratio of local maximum thickness-to-chord is greater than the ratio of root maximum thickness-to-chord for the majority of the wingtip span.

In accordance with other aspects of this invention, a transonic wing is provided having a main wing portion having an outboard end and a leading edge, the outboard end including a leading-edge nose radius. The transonic wing further includes a raked wingtip having a root end connected to the main wing outboard end. Each raked wingtip further including a plurality of local airfoils each having a leading-edge nose radius, a chord, and a maximum thickness. The ratio of local nose radius to chord divided by the root nose radius to chord is greater than about 1.5 over the majority of the raked wingtip span. The ratio of wingtip local maximum thickness divided by wingtip local chord is more than the ratio of wingtip root maximum thickness divided by wingtip root chord for the majority of the wingtip span.

In accordance with still further aspects of this invention, a raked wingtip is provided having an inboard end, an outboard end, and a transition region located at the inboard end and adapted to connect to a transonic main wing outboard end. The wingtip further includes a plurality of local airfoils each having a maximum thickness and a chord. The ratio of wingtip local maximum thickness-to-chord is greater than about 0.12 over the majority of the wingtip span. The thickness-to-chord ratio generally increases in the outboard direction for the majority of the wingtip span.

In accordance with still other aspects of this invention, a generally planar raked wingtip is provided, including a leading edge, a trailing edge, a chord, and a leading-edge nose radius. The ratio of leading-edge nose radius-to-chord is greater than about 1.5% over the majority of the span of the raked wingtip. The radius-to-chord ratio generally increases in the outboard direction over the majority of the wingtip span.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
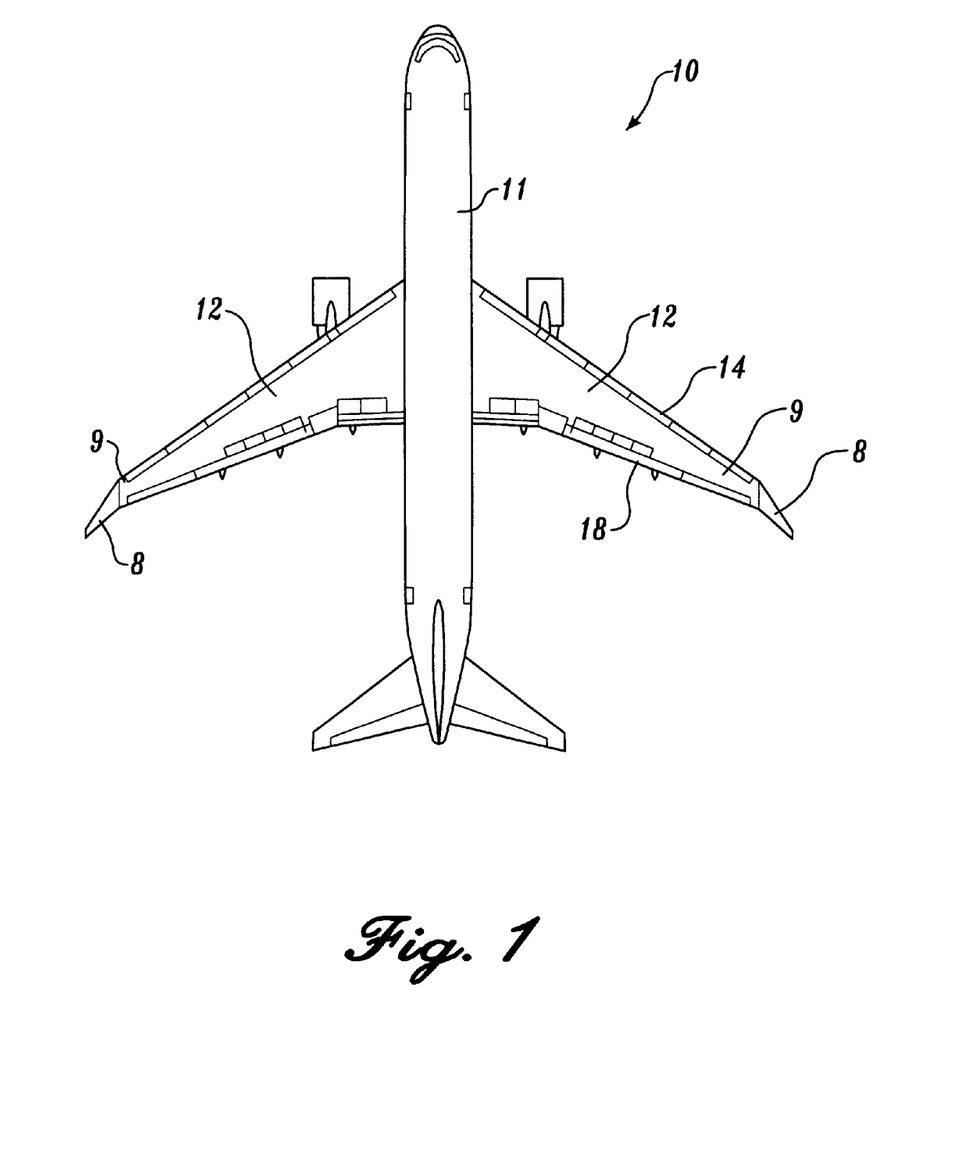
FIG. 1 is a plan view of one embodiment of a pair of blunt-leading-edge raked wingtips formed in accordance with this invention as applied to the main wings of a commercial aircraft.

FIG. 1 illustrates an embodiment of a blunt-leading-edge raked wingtip 8 (also referred to herein as a blunt raked wingtip) formed in accordance with the present invention as applied to one arrangement of an otherwise conventional jet aircraft 10. The aircraft includes a fuselage 11 and two outwardly-extending sweptback main wings 12 each having a leading edge 14 with a leading-edge sweep angle $\Lambda_{LE}$, and a trailing edge 18 with a trailing-edge sweep angle $\Lambda_{TE}$ of lesser or equal degree as the leading-edge sweep angle $\Lambda_{LE}$. The main wings are formed in a conventional manner, such as including a center wing box, a left wing box, and a right wing box. Each wing box is similarly configured using front and rear spars. The left and right wing boxes further include various upper and lower skin panels. The main wing further includes conventional high lift and control surface systems, such as slats, flaps, ailerons, spoilers, etc. A pair of blunt raked wingtips 8 formed in accordance with the present invention are provided at each main wing outboard end 9.

Figure 2A:
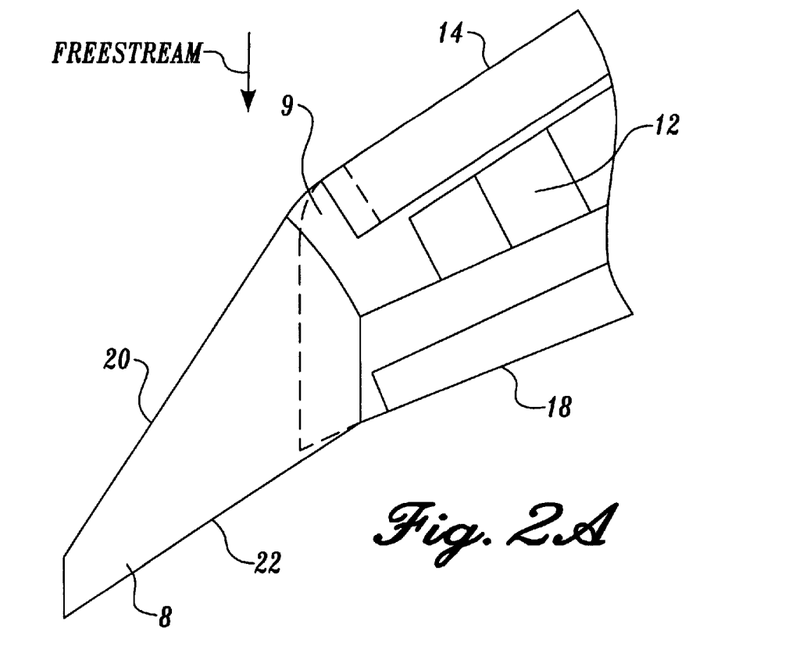
FIG. 2A is a detail plan view of an embodiment of a blunt-leading-edge raked wingtip with a conventional main wing outboard end shown in phantom.
Figure 2B:
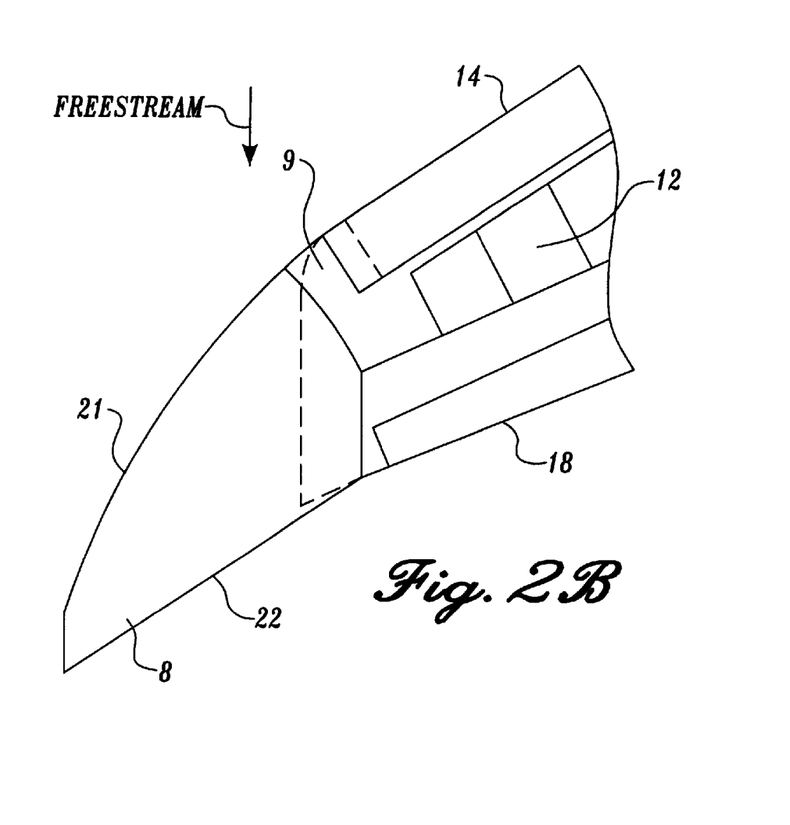
FIG. 2B is a detail plan view of another embodiment of a blunt-leading-edge raked wingtip with a conventional main wing outboard end shown in phantom.

Referring to FIG. 2A, the blunt raked wingtips 8 are elements having a leading edge 20 with a sweep angle that is greater than the main wing leading-edge sweep angle $\Lambda_{LE}$. The sweep angle of the blunt raked wingtip trailing edge 22 is preferably congruent with or greater than the sweep angle $\Lambda_{TE}$ of the main wing trailing edge 18. Though it is preferred from a manufacturing perspective to use a blunt raked wingtip having a linear leading edge 20 as shown in FIG. 2A, it is within the scope of the present invention to form a raked wingtip leading edge with varying sweep angle, thus resulting in a curved leading edge 21 in plan view, as shown by the example embodiment in FIG. 2B. For simplicity in manufacturing and airplane systems, minimization of in-service maintenance costs, and minimization of weight, blunt raked wingtips of the present invention are preferably formed without movable leading-edge protection devices, e.g., leading-edge slats, krueger flaps, etc.

The blunt raked wingtips 8 may be added to a pre-existing wing or may be formed integrally or otherwise during the construction of a new wing. In either case, the structure of the main wing 12 should be modified as appropriate to accommodate the addition of the blunt raked wingtip. In the embodiment of FIG. 2A, the blunt raked wingtip is bolted to a strengthened rib located at the outboard end of the main wing spars. There are numerous other ways in which the structure of the blunt raked wingtip may be connected with the main wing.

Figure 3A:
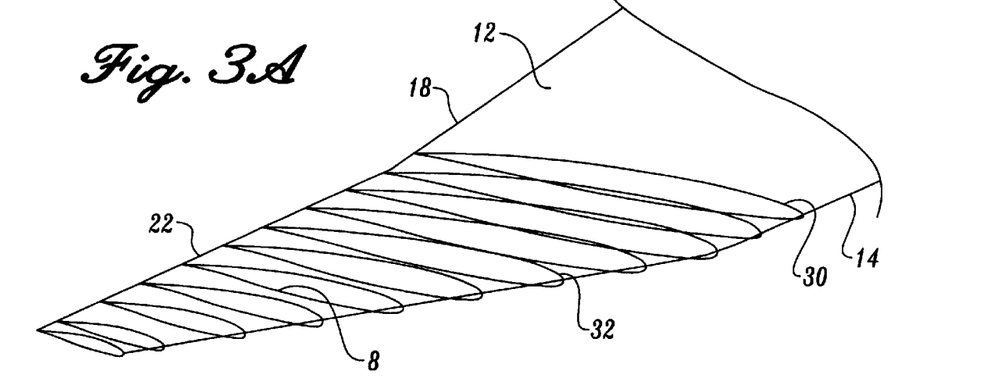
FIG. 3A is a perspective view illustrating schematically the transition in airfoil shapes between a main wing outboard end with conventional transonic airfoils and a blunt-leading-edge raked wingtip formed in accordance with the present invention.
Figure 3B:
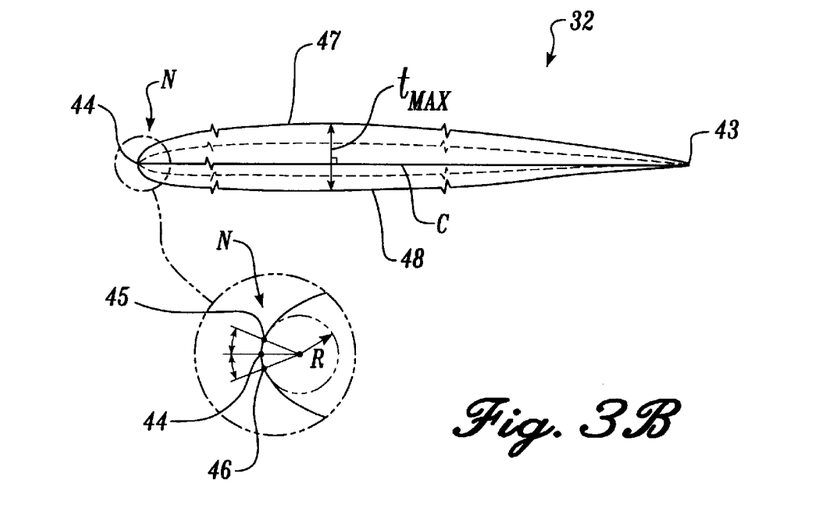
FIG. 3B is a cross-sectional view of an embodiment of a blunt-leading-edge raked wingtip airfoil with a conventional transonic raked wingtip airfoil shown in phantom.

FIGS. 3A and 3B illustrate various parameters used to quantitatively describe the unique nature of the current invention. The cross-sectional view of FIG. 3B is taken at approximately the midspan of the blunt raked wingtip 8. The phantom line represents a conventional transonic airfoil taken at the outboard end of a main wing. Both airfoils are scaled by their local chord. Referring to FIG. 3A, a local airfoil 32 is defined as the cross-sectional shape created by the intersection of the raked wingtip 8 with a plane that is upright and generally parallel to the freestream air flow (or flight direction.) The total combination of local airfoils defines the exterior shape of the blunt raked wingtip. Similarly, the main wing includes local airfoils 30. Referring to FIG. 3B, each wingtip local airfoil 32 includes a trailing-edge point 43, a leading-edge point 44, a chord c, and a maximum thickness $t_{max}$. The trailing-edge point 43 is defined as the aft-most point of the airfoil if such a unique point exists, or as the centroid of all aft-most points if otherwise. The leading-edge point 44 is defined as the point on the airfoil furthest from the trailing-edge point 43. The chord c is defined as the linear distance from the leading-edge point 44 to the trailing-edge point 43.

Referring to the enlarged portion of FIG. 3B, each wingtip local airfoil further includes a nose N having a nose radius R. As used herein, the nose radius R is defined as the radius corresponding to a circle that passes through three points, 44, 45, and 46. Point 44 is the leading-edge point defined above. Points 45 and 46 are the points located a distance 0.2% c in arc length away from point 44, measured along the upper and lower surfaces of the local airfoil, respectively. This definition of nose radius R approximates the average radius of curvature over the most forward portion of the airfoil. Also shown in FIG. 3B is a wingtip maximum local airfoil thickness $t_{max}$ defined as the maximum distance normal to the chord line between the upper surface 47 of the wingtip local airfoil and the lower surface 48 of the wingtip airfoil.

Still referring to FIG. 3B, a blunt-leading-edge raked wingtip formed in accordance with the present invention includes local airfoils having relatively large values of nose radius-to-chord ratio (R/c). In select embodiments, the blunt raked wingtip additionally includes relatively large values of thickness-to-chord ratio ($t_{max}/c$). These characteristics are in relation to the adjacent main wing airfoil nose radius-to-chord and thickness-to-chord ratios. In the arrangement of FIG. 3A, the airfoils 30 of the main wing 12 have small nose radius-to-chord ratios (and hence "sharper" leading edges) in order to provide optimal airflow characteristics during cruise flight operations at high subsonic Mach numbers. This causes the blunt raked wingtip nose to appear more blunt than the adjacent main wing outboard end nose.

FIGS. 4A–4H are plots that illustrate the semispan distributions of geometric parameters of one embodiment of a blunt raked wingtip formed in accordance with the present invention. These values are meant to be illustrative of general proportions and trends, and not limiting with regard to any particular value or any particular configuration. As such, numerous variations in these plots are well within the scope of the present invention. In the embodiment described in FIGS. 4A–4H, a reduction of drag was observed of an amount on the order of 5% for both cruise and takeoff climb. Drag reduction in general, however, will depend largely on the main wing span loading before the addition of the blunt raked wingtip.

Figure 4A:
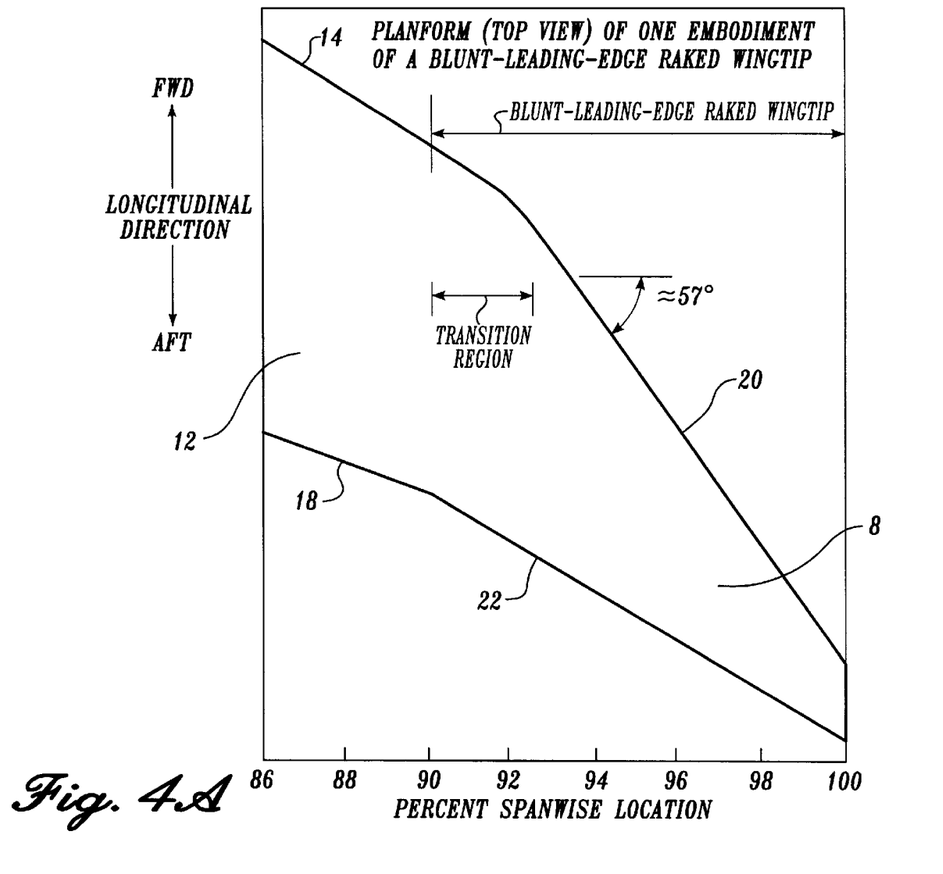
FIGS. 4A–4H are plots of an embodiment of a blunt-leading-edge raked wingtip formed in accordance with the present invention, the horizontal axis indicating a semispan location along the percent spanwise direction, the vertical axes indicating various aspects of the wingtip geometry.

In FIG. 4A, percent spanwise location is shown along the x-axis, and longitudinal (or stationwise) location is shown along the y-axis. The percent spanwise location is in reference to a single wing, i.e., in reference to a total wing semispan. The embodiment illustrated includes a linear leading edge 20 over most of the blunt raked wingtip span with a sweep angle of approximately 57°. The blunt raked wingtip includes a portion labeled "Transition Region". The transition region is that portion required to smoothly transition the shape of the main wing into the shape of the majority of the raked wingtip. In the embodiment shown, the blunt raked wingtip (and transition region) starts at about 90% semispan, and the transition region ends at about 93% semispan. By definition, the blunt raked wingtip ends at 100% semispan.

Figure 4B:
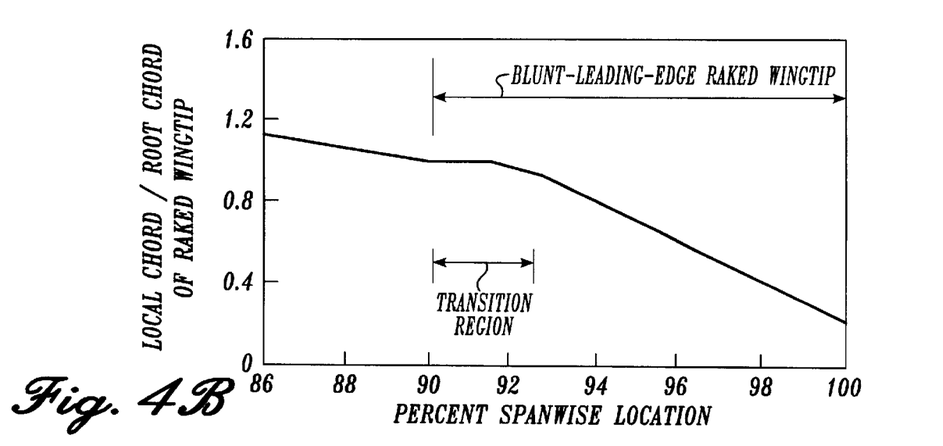

Referring to FIG. 4B, the y-axis is a ratio of the blunt raked wingtip local chord to the blunt raked wingtip root chord. The x-axis is percent spanwise location along the wing semispan. The wingtip root chord is determined at the start of the wingtip raked, i.e., in FIG. 4B at about 90% semispan. FIGS. 4A and 4B illustrate that for this particular embodiment, the wingtip leading edge remains congruent with the wingtip trailing edge for the majority of the transition region, after which the wingtip leading-edge sweep angle increases to taper the wingtip in the outboard direction.

Figure 4C:
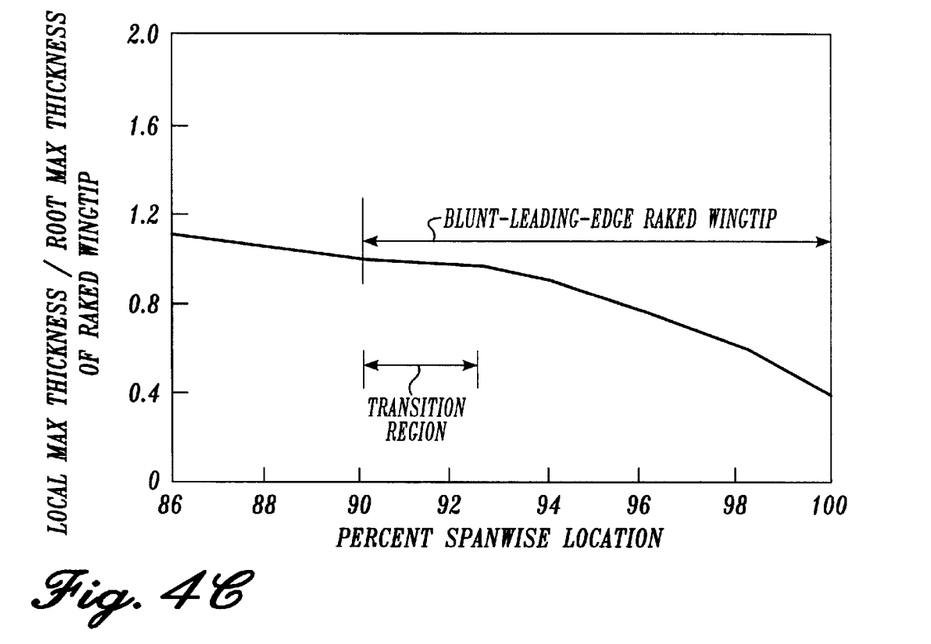
Figure 4D:
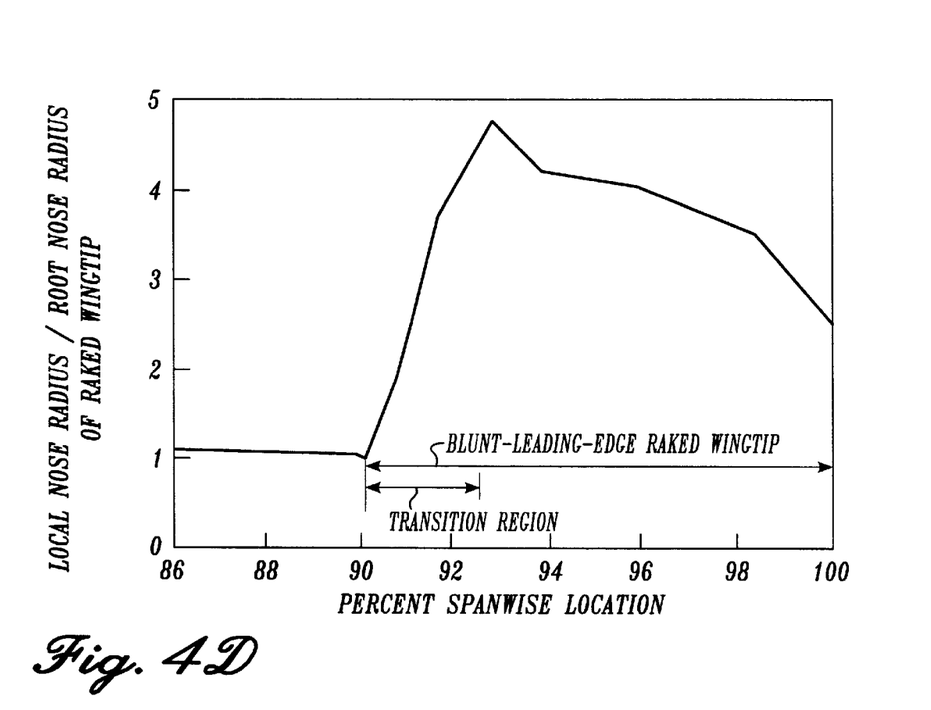

Referring to FIG. 4C, the y-axis is a ratio of the blunt raked wingtip local airfoil maximum thickness $t_{max}$ divided by the raked wingtip root airfoil maximum thickness. FIG. 4D is a plot of the blunt raked wingtip local nose radius R divided by the raked wingtip root nose radius versus percent spanwise location along the wing semispan. FIG. 4C illustrate that in this embodiment, the blunt raked wingtip maintains nearly constant thickness for the majority of the transition region. After the transition region, the local airfoil thickness decreases to approximately 40% the wingtip root thickness. FIG. 4D illustrates that in this embodiment, the blunt raked wingtip local nose radius R increases sharply in the transition region, after which the wingtip nose radius R decreases, though it is still larger than its initial value and still larger than the main wing leading-edge radius at the main wing outboard end.

Various blunt raked wingtip embodiments may be formed in accordance with the present invention, including those embodiments having a ratio of nose radius divided by root nose radius equal to or greater than about 2 over the majority of the blunt raked wingtip span; those equal to or greater than about 3 over at least a quarter of the span; those that include a ratio equal to or greater than about 4; and others.

Figure 4E:
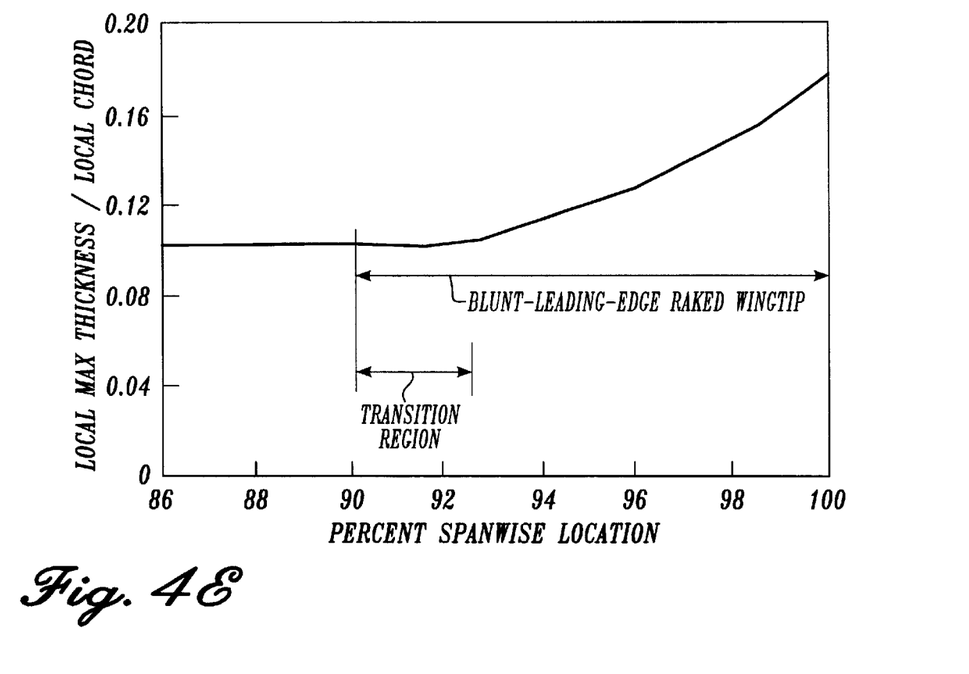
Figure 4F:
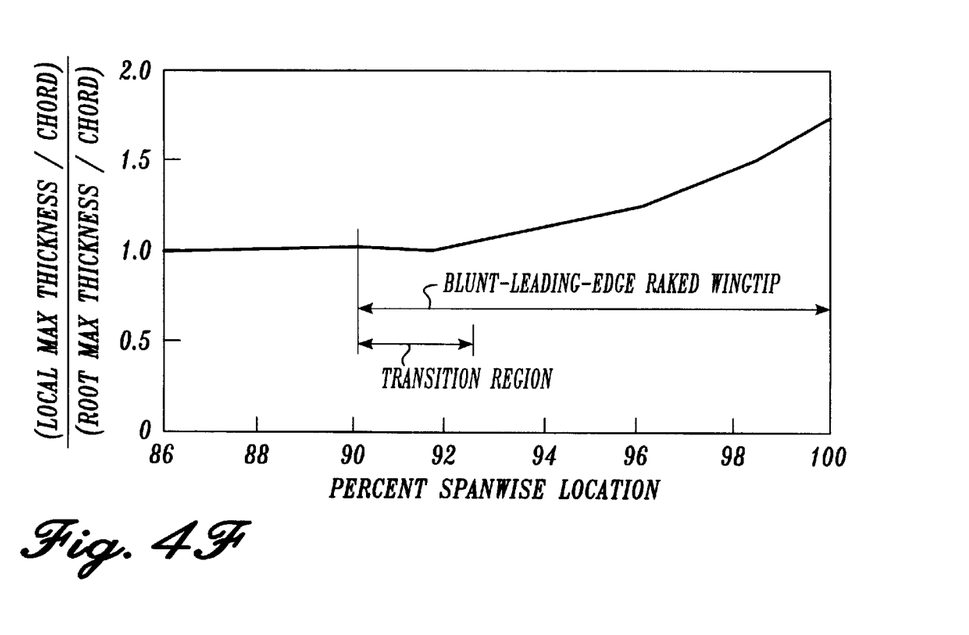
Figure 4G:
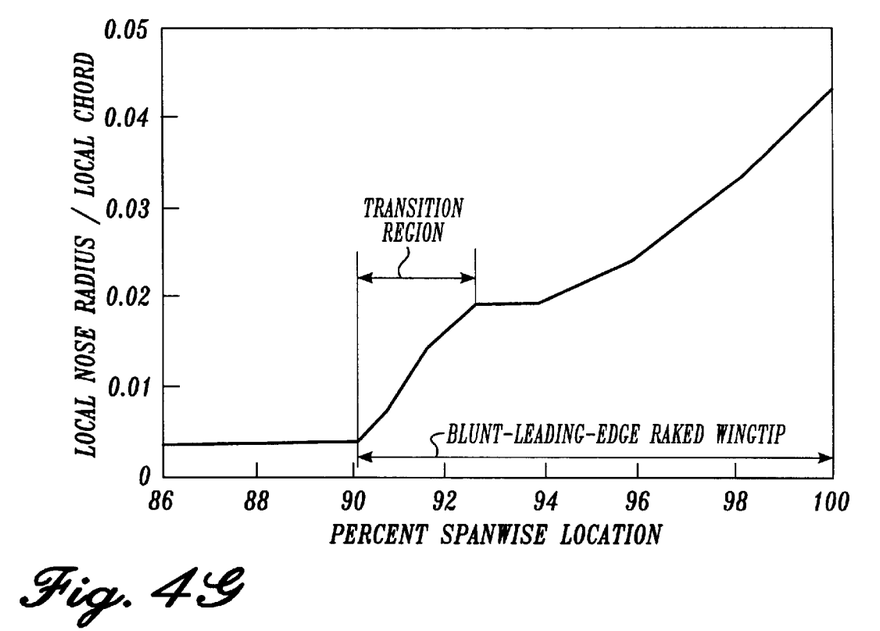

These features are further illuminated by reference to FIGS. 4E–4G. FIG. 4E is a plot of the ratio of the blunt raked wingtip local airfoil maximum thickness to chord, $(t_{max}/c)_{local}$. FIG. 4E illustrates that the blunt raked wingtip of this embodiment includes an increased local maximum thickness-to-chord ratio $(t_{max}/c)_{local}$ over the majority of the raked wingtip span, relative to the wingtip root (and/or majority of main wing outboard end, depending on the particular main wing.) Combining the information of FIGS. 4B, 4C, and 4E indicates that this ratio increases because the local chord decreases at a faster rate that the local maximum thickness decreases.

For one embodiment of the blunt raked wingtip shown in FIG. 4E, the local maximum thickness to local chord ratio increased from about 10% at the root of the blunt raked wingtip to about 17% at the outboard edge. In another blunt raked wingtip embodiment, the ratio is in the range of about 8% to about 17%. In yet another embodiment, the ratio is in the range of about 10% to about 24%. Various other embodiments of blunt raked wingtip local maximum thickness-to-chord ratio are possible, including those equal to or greater than about 11.5% over the majority of the blunt raked wingtip span; those equal to or greater than about 12% over the majority of the span; those equal to or greater than about 13% over at least a quarter of the span; those equal to or greater than about 14% over a portion of the span; those that increase in the outward direction over the majority of the span of the raked wingtip; and others.

FIG. 4F is the same FIG. 4E plot normalized by the ratio of wingtip root maximum thickness to chord, $(t_{max}/c)_{root}$. The wingtip root values are those values at the inboard end of the blunt-leading-edge raked wingtip. Because it is anticipated that the blunt raked wingtip will be implemented with a transition region that includes an initial radius, maximum thickness, and chord that are similar to the majority of the main wing outboard end, the wingtip root values are a good approximation to those main wing values.

Referring to FIG. 4F, the local ratios $(t_{max}/c)_{local}$ are plotted after being divided by the root ratio $(t_{max}/c)_{root}$. As shown, the wingtip ratio at the 100% semispan location corresponds to an increase of approximately 70% over its starting root value. In another embodiment, the increase in ratio is about 125%. In yet another embodiment, the increase in ratio is about 140%. Additional embodiments of the blunt raked wingtip include local maximum thickness-to-chord ratio divided by the root maximum thickness-to-chord ratios of equal to or greater than about 1.15 over the majority of the blunt raked wingtip span; ratios equal to or greater than about 1.25 over the majority of the span; ratios equal to or greater than about 1.40 over at least a quarter of the span; ratios that increase in the outward direction over the majority of the span of the raked wingtip; and others. These values will partially depend on the particular main wing outboard end and/or wingtip root thickness-to-chord ratio.

FIG. 4G is a plot of the ratio of the blunt raked wingtip local airfoil radius to chord, $(R/c)_{local}$. FIG. 4G illustrates that the blunt raked wingtip includes an increased local radius-to-chord ratio $(R/c)_{local}$ relative to the wingtip root. Combining the information of FIGS. 4B, 4D, and 4G indicates that this ratio increases dramatically because the local chord decreases while the local radius increases. At the 100% spanwise location, the wingtip radius-to-chord ratio is significantly greater than the root ratio.

For one embodiment of the blunt raked wingtip, the majority of the ratios of local radius-to-chord are in the range of about 0.5% to about 6.0%; for another embodiment, the majority are in the range of about 0.5% to about 4.20%. These upper end values of R/c ratios are much larger than many of the values found on conventional main wing airfoils of transonic aircraft. Various other embodiments of blunt raked wingtip local nose radius-to-chord ratio are possible, including those embodiments equal to or greater than about 1.5% over the majority of the blunt raked wingtip span; those equal to or greater than about 2% over the majority of the span; those equal to or greater than about 3% over at least a quarter of the span; those equal to or greater than about 4% over a portion of the span; those up to about 4.2%; those that increase in the outward direction over the majority of the span of the raked wingtip; and others.

Figure 4H:
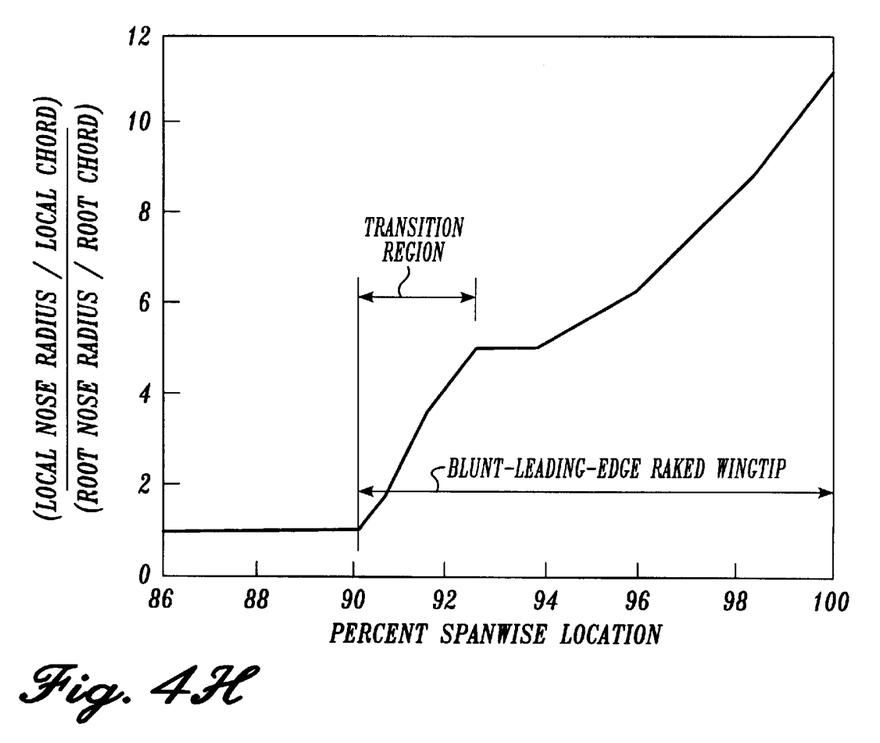

FIG. 4H is the same FIG. 4G plot normalized by the ratio of wingtip root radius to chord, $(R/c)_{root}$, i.e., the local radius-to-chord ratios are plotted after being divided by the root radius-to-chord ratio. As shown, the wingtip ratio at the 100% semispan location corresponds to an increase of approximately 11 times its starting root value (i.e., an increase of more than 1000%.) In addition, various other embodiments of the blunt raked wingtip with local nose radius-to-chord ratios divided by the root nose radius-to-chord ratio are possible, including those embodiments equal to or greater than about 1.5 over the majority of the blunt raked wingtip span; those equal to or greater than about 5 over the majority of the span; those equal to or greater than about 8 over at least a quarter of the span; those equal to or greater than about 10 over a portion of the span; those that increase in the outward direction over the majority of the span of the raked wingtip; and others.

The performance of a blunt raked wingtip airfoil having a relatively large radius-to-chord ratio benefits by the presence of a relatively large thickness-to-chord ratio. Such thick airfoils would be impractical for typical transonic main wing applications due to the resulting shock-wave-related drag penalties. However, as used in the present invention blunt raked wingtip, the sectional lift coefficients are lower than those for the critical sections of the main wing, and the wingtip leading-edge sweep angle is higher than for the main wing. These two factors allow for larger nose radii and thicker wingtip airfoils without a significant drag penalty due to shock waves.

Figure 5A:
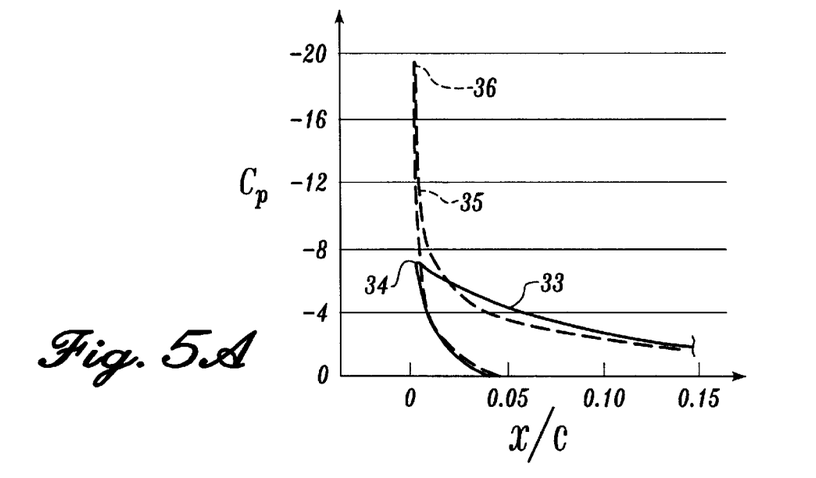
FIG. 5A is an illustration of a chordwise pressure distribution for an embodiment of a blunt-leading-edge raked wingtip formed in accordance with the present invention taken at an angle of attack slightly greater than a typical maneuvering flight angle of attack, with the chordwise pressure distribution for a raked wingtip with conventional transonic airfoils shown in phantom.
Figure 5B:
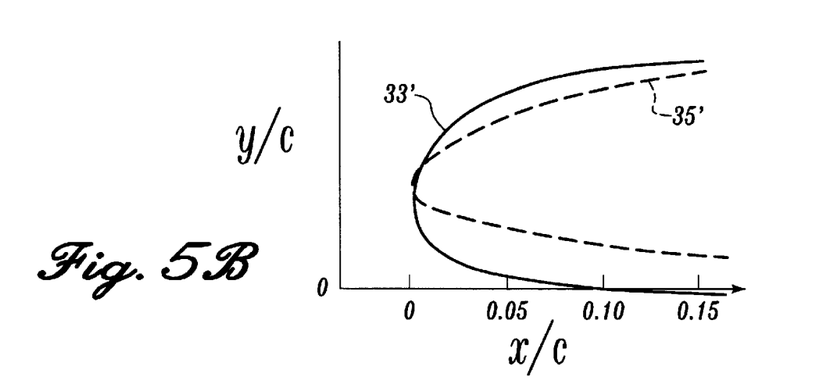
FIG. 5B is an illustration of chordwise geometries corresponding to the pressure distributions of FIG. 5A.

The increased local nose radius-to-chord ratios, $(R/c)_{local}$, of blunt raked wingtips 8 (relative to radius-to-chord ratios of conventional transonic airfoils) provide a more benign pressure coefficient $(C_p)$ distribution for the boundary layer during low speed flight. As an illustration of this feature, FIG. 5A plots the calculated chordwise potential-flow $C_p$ distributions at a midspan location of two separate raked wingtips each having the same planform shape, though different airfoil shapes. The solid line (labeled 33) shows the $C_p$ distribution for one embodiment of a blunt raked wingtip formed in accordance with the present invention. The phantom line (labeled 35) shows the $C_p$ distribution for a raked wingtip with conventional transonic airfoils. The calculations were performed using a three-dimensional potential-flow aerodynamics analysis methodology. The calculations were performed for a takeoff configuration at an angle of attack slightly greater than a typical maneuvering angle of attack. FIG. 5B shows the local airfoil leading-edge geometries corresponding to the pressure-coefficient values of FIG. 5A.

Figure 6:
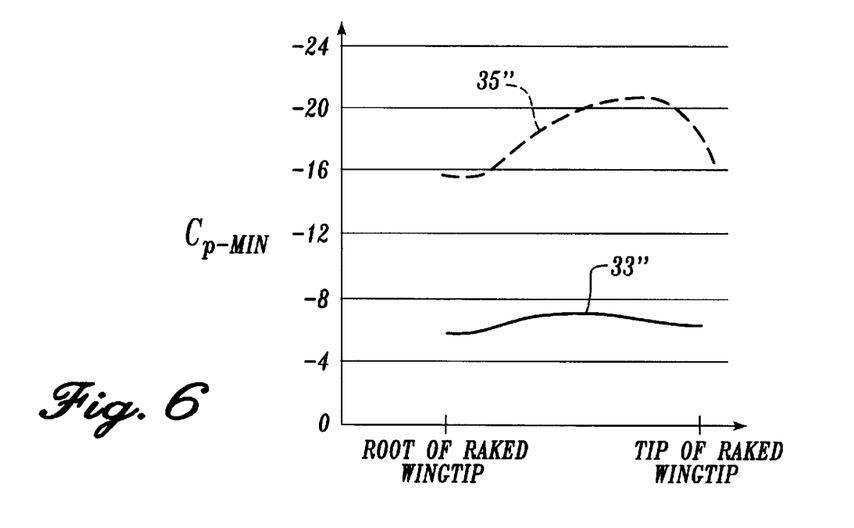
FIG. 6 is an illustration of minimum pressure coefficient, $C_{Pmin}$, versus spanwise location for an embodiment of a blunt-leading-edge raked wingtip airfoil formed in accordance with the present invention taken at an angle of attack slightly greater than a typical maneuvering flight angle of attack, with the minimum pressure coefficient for a raked wingtip with conventional transonic airfoils shown in phantom.

The magnitude of $C_{pmin}$ can be used to estimate the likelihood of large-scale boundary-layer separation, with more negative values corresponding to greater likelihood of separation. As shown in FIG. 5A, the minimum pressure coefficient value $C_{pmin}$ (labeled item 36) is near −20 for the raked wingtip with conventional transonic airfoils, whereas the minimum pressure coefficient value $C_{pmin}$ (labeled item 34) is about −7 for the blunt raked wingtip. As evident from viewing in FIG. 5A, use of a blunt raked wingtip airfoil can significantly reduce the magnitude of $C_{pmin}$ on the wingtip. FIG. 6 shows the spanwise distributions of $C_{pmin}$ for the same calculations shown in FIG. 5A. Based on FIGS. 5A and 6, large-scale separation is predicted to occur at a lower angle of attack for the raked wingtip with conventional transonic airfoils than for the blunt raked wingtip.

Figure 7:
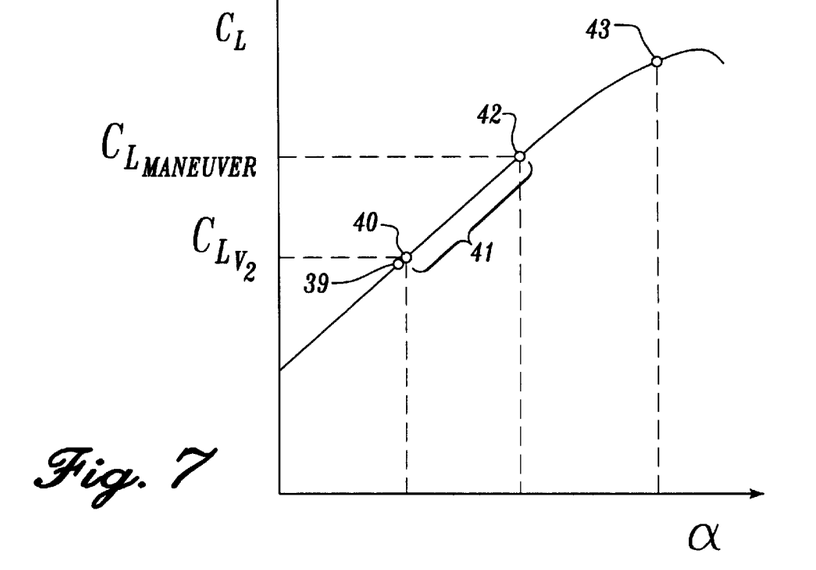
FIG. 7 is an illustration of lift coefficient, $C_L$, versus angle of attack, $\alpha$, for an aircraft including an embodiment of a blunt-leading-edge raked wingtip formed in accordance with the present invention.

The blunt raked wingtip 8 can provide for flight at high angles of attack prior to the onset of large-scale boundary-layer separation. As illustration of this feature, shown in FIG. 7 is a first quadrant plot of aircraft lift coefficient versus angle of attack for a commercial transport airplane in a takeoff configuration. The information in FIG. 7 is based on potential-flow $C_p$ distributions correlated with an experimental database to predict the onset of large-scale boundary-layer separation.

Item 41 is the range of lift coefficients that corresponds to takeoff climb angle of attack operating conditions. This range is bounded at a lower angle of attack by the takeoff climb point 40, and at a higher angle of attack by the maneuver point 42, which allows for normal bank angle capability plus overshoot. In some configurations, the implementation of a raked wingtip with conventional transonic airfoils can result in a lift coefficient value corresponding to large-scale boundary-layer separation 39 that is near the takeoff climb point 40. Such a configuration could result in performance penalties and/or operating envelope limitations. In contrast, a blunt raked wingtip can result in a larger lift coefficient value for large-scale boundary-layer separation 43 occurring at a correspondingly larger angle of attack. Thus, in some configurations, the blunt raked wingtip 8 can significantly shift the onset of large-scale boundary-layer separation, making the use of the raked wingtip a viable design option, particularly for aircraft with conventional transonic airfoils over the main wings.

At high speeds, aircraft operate at much lower angles of attack. The blunt raked wingtip must be carefully designed to avoid a large negative $C_p$ value on the lower surface which could lead to separation and increased high speed drag.

Figure 8:
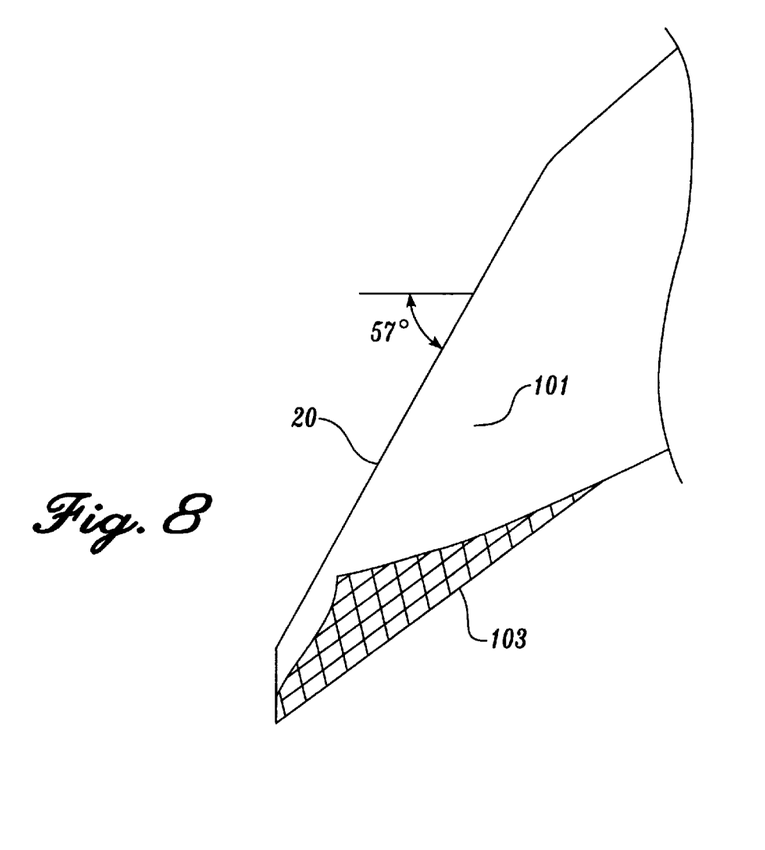
FIG. 8 is a plan view illustration showing the extent of attached boundary-layer flow on a blunt-leading-edge raked wingtip formed in accordance with the present invention at an angle of attack about 1 degree larger than a typical maneuvering flight angle of attack.

FIG. 8 is a plan view of an example blunt raked wingtip with a linear leading edge 20 and a sweep angle of about 57 degrees. FIG. 8 illustrates the results of a flow-visualization test of the device for a takeoff configuration at an angle of attack about 1 degree higher than the maneuver angle of attack for a typical takeoff-climb. The maneuver angle of attack is the upper end of the normal operating range of angle of attack. The cross-hatched region 103 indicates separated boundary-layer flow, and the non-cross-hatched region 101 indicates attached boundary-layer flow. This datum demonstrates that the blunt raked wingtip is successful in maintaining a large region of attached flow even at high angles of attack. In this particular test, the blunt raked wingtip reduced the takeoff-climb drag by over 5%, confirming that the small amount of trailing edge separation did not result in an unacceptable drag penalty. Measurements of the unsteady bending moments confirm that the small amount of trailing edge separation did not result in significant buffet.

As will be appreciated from a reading of the above, the present invention blunt raked wingtip overcomes a number of disadvantages associated with conventional raked wingtips, such as those discussed in the Background section above. Overcoming these disadvantages allows engineers to design high-subsonic-Mach-number aircraft that utilize raked wingtips while realizing the full performance benefits that they offer.

Specifically, a blunt raked wingtip formed in accordance with the present invention avoids the occurrence of adverse low speed aerodynamic characteristics caused by premature large-scale boundary-layer separation. This is accomplished without requiring the use of leading-edge high-lift devices, such as slats. The advantages of this invention therefore include drag reductions for both cruise and takeoff climb with minimum impact to the weight, structural complexity, and production cost of the wing configuration. Further, the lack of any moving parts reduces maintenance costs for airline operations.

Compared to conventional wingspan extensions, the relatively high taper ratio of the present invention wingtips results in less added area and a lower load at the high-load factor structural design conditions. The sweptback nature of the blunt raked wingtips causes the adjacent wing sections to twist more nose-down at the high-load factor structural design conditions and thereby unloads the outboard wing. The blunt raked wingtips have the additional benefit of attenuating wing flutter relative to conventional wingspan extensions. The above items each result in lower airplane weight relative to a conventional wingspan extension, since correspondingly less structural weight is required.

The blunt raked wingtip is applicable to a multitude of aircraft, including those designed to travel at a cruise Mach number in the range of about 0.7 to about 1.0; those designed to travel in the range of about 0.74 M to about 1.0 M; those designed to travel in the range of about 0.78 M to about 1.0 M; as well as others. In addition, the blunt raked wingtip is applicable to main wings having various leading-edge sweep angles, including those with a leading-edge sweep angle of about 27 degrees or more; those with a leading-edge sweep angle of about 15 degrees or more; those with a leading-edge sweep angle in the range of about 27 degree to about 40 degrees; those with a leading-edge sweep angle in the range of about 15 degree to about 40 degrees; as well as others. Further, various span sizes of blunt raked wingtip are possible, including those that increase the wingspan by about 4% or more; those that increase the wingspan by about 8% or more; those that increase the wingspan by about 10%; those that increase the wingspan by up to about 15%; and others. Various sweep angles for the blunt raked wingtip are possible as well, including angles equal to or greater than about 40 degrees; angles equal to or greater than about 50 degrees; those angles in the range of about 50 degrees to about 60 degrees; and others.

While the preferred embodiment of the invention has been illustrated and described, it will be appreciated that various changes can be made therein without departing from the spirit and scope of the invention. For example, it is within the scope of the present invention to include airflow and control surface members on blunt raked wingtips formed in accordance with the present invention. It is preferable to omit these devices in order to keep the complexity of the blunt raked wingtip and wing configuration to a minimum. By way of further example, various lights may be placed on the blunt raked wingtips or on the main wing surfaces in the vicinity of the blunt raked wingtips as needed and as space allows.

What is claimed is:

1. In a high subsonic Mach number airplane operating at or above Mach numbers of about 0.70 but less than 1.0 M during normal cruise flight operations, the airplane having a fuselage and opposed main swept wings, each swept wing having an inboard end attached to the fuselage and an outboard end an improvement comprising:

a pair of raked wingtips, each wingtip having an outboard end and a root end connected to a main wing outboard end; the span of each raked wingtip being at least 4% of the semispan; each raked wingtip further including a plurality of local airfoils each having a leading-edge nose radius, a chord, and a maximum thickness; wherein the ratio of wingtip local nose radius-to-chord is greater than the ratio of wingtip root nose radius-to-chord over the majority of the wingtip span; and wherein from the wingtip root end to the wingtip outboard end the wingtip local nose radii increase in a transition region and then generally decrease thereafter;

each raked wingtip having a camber that remains constant or decreases in the outboard direction and a trailing edge bluntness that remains constant or decreases in the outboard direction.

2. The improvement according to claim 1 wherein the relative bluntness of the raked wingtips accomplishes at least one of minimizing boundary-layer separation, minimizing drag associated with boundary-layer separation, and preventing premature buffeting during low speed flight.

3. The airplane improvement according to claim 1, wherein the ratio of local nose radius to local chord generally increases in the outboard direction.

4. The airplane improvement according to claim 1, wherein the raked wingtips are fixed structure containing no leading-edge protective devices.

5. The airplane improvement according to claim 1, wherein the wingtip leading edge includes a linear shape in plan view over the majority of the wingtip span.

6. The airplane improvement according to claim 1, wherein the wingtip leading edge includes a curved shape in plan view.

7. The airplane improvement according to claim 1, wherein the ratio of wingtip local maximum thickness-to-chord is greater than the ratio of wingtip root maximum thickness-to-chord over the majority of the wingtip span.

8. The airplane improvement according to claim 7, wherein the ratio of wingtip local maximum thickness-to-chord increases to values of at least 0.15 over a portion of the wingtip span.

9. The airplane improvement according to claim 1, wherein the ratio of local nose radius to local chord increases in the outboard direction for the majority ot each wingtip span, the local nose radius divided by local chord being greater than about 2% for the majority of the airfoils.

10. The airplane improvement according to claim 1, wherein the raked wingtips are fixed structure containing no mechanical leading-edge protective devices; the raked wingtip leading edge has a sweep angle of at least about 55°; the ratio of wingtip maximum thickness-to-chord divided by the ratio of wingtip root maximum thickness-to-chord is greater than 1 over the majority of the wingtip span; the local nose radius divided by the local chord being greater than about 2% for the majority of the airfoils.

11. The airplane improvement according to claim 1, wherein the span of each raked wingtip is about 10% the total semispan; the leading edge sweep of the main wing is about 34 degrees; the raked wingtip has a linear leading edge over the majority of its span with a wingtip leading edge sweep angle of about 57°; the wingtip maximum thickness-to-chord ratio increases from about 10% at the wingtip root to at least about 16% at the wingtip outboard end; the nose radius-to-chord increases from about 0.4% at the root to at least about 4.0% at the wingtip outboard end; and the cruise Mach number of the airplane is equal to or greater than about Mach 0.78.

12. In a high subsonic Mach number airplane, characterized by the combination of opposed main wings each including an outboard end; and a pair of raked wingtips, each wingtip having a root end connected to a main wing outboard end;

each raked wingtip further including a plurality of local airfoils each having a leading-edge nose radius, a chord, and a maximum thickness; the span of each raked wingtip being at least 4% of the total semispan; wherein the ratio of local maximum thickness-to-chord is greater than the ratio ot root maximum thickness-to-chord for the majority of the wingtip span, and wherein from the wingtip root end to the wingtip outboard end the wingtip local nose radii increase in a transition region and then generally decrease thereafter;

each raked wingtip having a camber that remains constant or decreases in the outboard direction and a trailing edge bluntness that remains constant or decreases in the outboard direction.

13. The combination according to claim 12, wherein the ratio of local maximum thickness-to-chord divided by the ratio of root maximum thickness-to-chord increases from 1 at the wingtip root to a value at least about 1.3 over a portion of the wingtip.

14. The combination according to claim 12, wherein each main wing further includes a leading-edge nose, in going from the main wing to the wingtip the nose transitions from a relatively sharp nose shape on the main wing to a relatively blunt nose shape on the raked wingtip.

15. The combination according to claim 12, wherein the ratio of wingtip local nose radius-to-chord divided by the ratio of wingtip root nose radius-to-chord increases from 1 at the wingtip root to an amount greater than about 1.5 over a portion of the wingtip span.

16. The combination according to claim 12, wherein the raked wingtips are fixed structure having a linear leading edge shape over the majority of the wingtip span and containing no leading-edge protective devices.

17. The combination according to claim 12, wherein the raked wingtips are fixed structure having a curved leading edge shape over the majority of the wingtip span and containing no leading-edge protective devices.

18. The combination according to claim 12, wherein the ratio of local nose radius to local chord generally increases in the outboard direction.

19. The airplane improvement according to claim 1, wherein the local nose radius-to-chord divided by the root nose radius-to-chord is greater than about 1.5 over the majority of the raked wingtip span; the wingtip local maximum thickness-to-chord divided by wingtip root maximum thickness-to-chord being greater than 1 for the majority of the wingtip span.

20. The improvement according to claim 19, wherein the relative thickness ot the wingtips accomplishes at least one of minimizing boundary-layer separation, minimizing drag associated with boundary-layer separation, and preventing premature buffeting during low speed flight.

21. The improvement according to claim 19, wherein the raked wingtips include linear leading edge shapes over the majority of the wingtip span and are fixed structure containing no leading-edge protective devices.

22. The improvement according to claim 19, wherein the raked wingtips are fixed structure having a curved leading edge shape over the majority ot the wingtip span and containing no leading,-edge protective devices.

23. A raked wingtip comprising:
   an inboard end, an outboard end, and a transition region located at the inboard end and adapted to connect to the outboard end of a high subsonic Mach number swept main wing;
   the wingtip further including a plurality of local airfoils each having a maximum thickness and a chord; wherein the ratio of wingtip local maximum thickness-to-chord is greater than about 0.12 over the majority of the wingtip span; the thickness-to-chord ratio generally increasing in the outboard direction for the majority of the wingtip span; and
   wherein from the raked wingtip inboard end to the raked wingtip outboard end the wingtip local nose radii increase in a transition region and then generally decrease thereafter;
   the raked wingtip having a camber that remains constant or decreases in the outboard direction and a trailing edge bluntness that remains constant or decreases in the outboard direction.

24. The wingtip according to claim 23, wherein the raked wingtips are fixed structure containing no leading-edge protective devices.

25. The wingtip according to claim 23, wherein the wingtip leading edge includes one of a linear shape and a curved shape in plan view.

26. The wingtip according to claim 23, wherein the ratio of wingtip local thickness-to-chord divided by the wingtip root thickness-to-chord has values greater than 1.15 over the majority of the wingtip span.

27. The wingtip according to claim 23, wherein the ratio of wingtip local nose radius-to-chord increases in the outboard direction for the majority of each wingtip span.

28. The wingtip according to claim 23, wherein the ratio of local nose radius to local chord generally increases in the outboard direction.

29. A raked wingtip comprising:
   a generally planar member having a leading edge, a trailing edge, a chord, and a leading-edge nose radius; the ratio of leading,-edge nose radius-to-chord being greater than about 1.5% over the majority of the span of the raked wingtip; the wingtip local nose radii increasing in a transition region and then generally decrease thereafter in the outboard direction; the raked wingtip having a camber that remains constant or decreases in the outboard direction and a trailing edge bluntness that remains constant or decreases in the outboard direction.

30. The wingtip according to claim 29, wherein the ratio of local nose radius-to-chord divided by root nose radius-to-chord being greater than about 1.5 over the majority of the wingtip span.

31. The wingtip according to claim 29, wherein the wingtip is fixed structure containing no operably movable parts.

32. The wingtip according to claim 29, wherein the leading edge is one of linearly and curved shape in plan view.

33. The wingtip according to claim 29, wherein the ratio of wingtip local thickness-to-chord divided by the wingtip root thickness-to-chord has the value greater than 1.15 over the majority of the wingtip span.

34. The wingtip according to claim 29, wherein the ratio of local nose radius to local chord generally increases in the outboard direction.

\* \* \* \* \*